United States Patent
Soliman et al.

(10) Patent No.: US 12,392,550 B2
(45) Date of Patent: Aug. 19, 2025

(54) INTEGRATED GAS COMPRESSION AND REFRIGERATION WITH INTERNAL COOLING REGENERATION

(71) Applicant: SAUDI ARABIAN OIL COMPANY, Dhahran (SA)

(72) Inventors: Mohamed A. Soliman, Dhahran (SA); Mohamed Alwani, Ras Tanura (SA); Faris Abdullah Alshuaibi, Al Khobar (SA); Nisar Ahmad K. Ansari, Ras Tanura (SA); Samusideen Adewale Salu, Ras Tanura (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 422 days.

(21) Appl. No.: 17/845,815

(22) Filed: Jun. 21, 2022

(65) Prior Publication Data
US 2023/0408190 A1    Dec. 21, 2023

(51) Int. Cl.
*F25J 1/02* (2006.01)
*B01D 53/00* (2006.01)

(52) U.S. Cl.
CPC .......... *F25J 1/0234* (2013.01); *B01D 53/002* (2013.01); *B01D 2256/24* (2013.01); *B01D 2257/702* (2013.01); *F25J 2220/64* (2013.01)

(58) Field of Classification Search
CPC .............. B01D 53/002; B01D 2256/24; B01D 2257/02; F25J 1/0234; C10G 5/06
See application file for complete search history.

(56) References Cited

U.S. PATENT DOCUMENTS

| | | |
|---|---|---|
| 5,497,626 A | 3/1996 | Howard et al. |
| 5,924,306 A | 7/1999 | Sinelnikov |
| 11,168,262 B2 | 11/2021 | Soliman et al. |

FOREIGN PATENT DOCUMENTS

RU    2718398 C1    4/2020

OTHER PUBLICATIONS

"Gas Oil Separation Plants", Saudi Aramco DeskTop Strandards, Engineering Encyclopedia. pp: 1-17, [17 Pages].
(Continued)

*Primary Examiner* — Robert Clemente
(74) *Attorney, Agent, or Firm* — Osha Bergman Watanabe & Burton LLP

(57) ABSTRACT

A gas oil separation plant may include a gas compression plant, configured to receive, compress, and separate one or more feed streams and a warmed refrigerant stream into a compressed gas stream and a condensate stream, a flow system for dividing the condensate stream into an export condensate stream and a refrigerant stream, a gas dewpoint control plant comprising a gas chiller configured for indirectly contacting the compressed gas stream with the refrigerant stream, producing the warmed refrigerant stream, and a flow line for feeding the warmed refrigerant stream to the gas compression plant. A method for gas oil separation may include compressing and separating one or more feed streams and a warmed refrigerant stream into a compressed gas stream and a condensate stream. The condensate stream is divided into an export condensate stream and the refrigerant stream which chills the compressed gas stream and becomes the warmed refrigerant stream.

12 Claims, 5 Drawing Sheets

(56) References Cited

OTHER PUBLICATIONS

Devold, Havard. "An Introduction to oil and gas production, transport, refining and petrochemical industry", Oil and Gas Production Handbook, ABB, ISBN 978-82-997886-3-2. Aug. 2013, pp. 1-162, [162 Pages].
"Engineering Standard", Gas Oil Separation Plants (GOSPs), Process Engineering Standards Committee. Feb. 26, 2013, pp. 1-32, [32 Pages].
Office Action issued in corresponding Saudi Arabian Application No. 123447332; dated May 25, 2025 (18 pages).

INTEGRATED GAS COMPRESSION AND REFRIGERATION WITH INTERNAL COOLING REGENERATION

BACKGROUND

Hydrocarbon processing plants for the oil and gas industry may require cooling in their facilities for various processes. For example, cooling may be required to bring the temperature of a particular stream down to acceptable levels for a downstream process. This cooling is often performed with a closed loop system using a refrigerant such as freon or propane. Such closed loop systems are commonly used in gas-oil separation plants.

A gas-oil separation plant (GOSP) is a plant used in the processing of crude oil that separates lighter components and other materials from a crude oil stream. There are multiple hydrocarbon streams of differing compositions in the gas-oil separation plant. Hydrocarbons in these streams are substantially free of hydrogen, and may comprise one or more of H2S, CO2, N2, methane, ethane, propane, butanes, pentanes, hexanes, and heavier hydrocarbons.

FIG. 1 is a depiction of an embodiment of a typical gas-oil separation plant. A gas compression plant 1 is utilized to compress the output streams from a crude processing plant 5. A high-pressure (HP) gas stream 2, a low-pressure (LP) gas stream 4, and an atmospheric (ATM) gas stream 6, products of various separation steps in the crude processing plant, are provided as feeds to the gas compression plant 1. The ATM gas stream 6 is sent into the atmospheric suction knockout drum 7, separating any condensed liquids, and the gas output of which is fed as the ATM compressor feed 16 into the atmospheric compressor 9 and compressed. The compressed product from compressor 9 is then cooled in after cooler 11 to condense heavy hydrocarbon from the compressed gas, before being fed into an atmospheric compressor discharge knockout drum 13.

The gas from the atmospheric compressor discharge knockout drum 13, ATM compressor gas 18, is mixed with the low-pressure (LP) gas stream 4 as feeds to suction knockout drum 15, the gas discharge of which, LP compressor feed 22, is fed to the low-pressure (LP) compressor 17. The LP compressor 17 compresses the gas. The compressed hydrocarbon stream from LP compressor 17 is then cooled in after cooler 19 to condense heavy hydrocarbons from the gas. LP compressor condensate 26 is then separated from LP compressor gas 24 in the LP compressor discharge knockout drum (KOD) 21.

The gas from the knockout drum 21, LP compressor gas 24, is fed to the suction knockout drum 23, where it mixes with the HP gas stream 2. The gas discharge from suction knockout drum 23, HP compressor feed 28, is fed into a high-pressure (HP) compressor 25. The HP compressor 25 compresses the gas to 450 to 500 psig. The discharge gas from HP compressor 25 is then cooled in the after cooler 27 to condense heavy hydrocarbon such as C3H8, C4H10, C5H12, and C6+ from the gas. HP compressor discharge knockout drum (KOD) 29 then separates the compressed and cooled compressor output into HP compressor condensate 30 and HP compressor gas 32.

The condensate 30 is combined with ATM compressor condensate 20, LP compressor condensate 26, and dewpoint KOD condensate 34, and pumped to condensate KOD 31. The condensate from condensate KOD 31, export condensate 38, is recovered as a condensate product.

HP compressor gas 32 from the HP condensate KOD 29 is fed to gas dehydration unit 41 in the gas dehydration and dewpoint control plant 3 to remove water to a level sufficient to avoid hydrate formation and corrosion in the export gas pipeline systems or downstream equipment. The dehydrated gas from the dehydration unit is then fed to dewpoint control unit gas chiller 37 and dewpoint KOD 39 to reduce the compressed gas hydrocarbon dew point to below 80° F., depending on the ambient condition, to prevent hydrocarbon condensation and liquid accumulation in the gas pipelines during transportation or during cooling in the downstream equipment. Here, HP compressor gas 32 is cooled in the gas chiller 37, before being sent to a knockout drum 39. As noted above, the dewpoint KOD condensate 34 from the knockout drum 39 is mixed with HP compressor condensate 30, LP compressor condensate 26, and ATM compressor condensate 20, and the combined stream is sent into the condensate collection knockout drum 31. Gas from knockout drum 39, export gas 36, is recovered as a compressed gas product.

As illustrated in FIG. 1, the required cooling for gas chiller 37 is provided by a closed loop refrigeration system, such as a closed loop propane or freon refrigeration system used to provide the cooling requirements via a propane/freon cooling plant 51. In this embodiment, propane is utilized in the refrigerant stream 63. The liquid propane is allowed to expand across valve 61. Pressure drop leads to cooling the propane. The cooled liquid propane is then fed to the propane chiller 37 to cool the inlet gas sent from the dehydration unit 41 to a desired temperature, for example 80° F., while the propane is heated in the chiller and then flows back to the propane/freon cooling plant 51 to a suction knockout drum 53 before entering the propane compressor 55. The compressor 55 compresses the propane before the compressed propane gas is cooled in the propane after cooler 57 which condenses all propane into liquid. The liquid propane then flows back to a drum 59 before cycling again through the closed loop.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a gas oil separation plant. The gas oil separation plant includes a gas compression plant, configured to receive, compress, and separate one or more feed streams and a warmed refrigerant stream into a compressed gas stream and a condensate stream, a flow system for dividing the condensate stream into an export condensate stream and a refrigerant stream, a gas dewpoint control plant comprising a gas chiller configured for contacting, in indirect heat exchange, the compressed gas stream with the refrigerant stream, producing the warmed refrigerant stream and a chilled compressed gas stream, and a flow line for feeding the warmed refrigerant stream to the gas compression plant.

In another aspect, embodiments disclosed herein relate to a process for gas oil separations. The process includes feeding an atmospheric gas stream, a low-pressure gas stream, a high-pressure gas stream, and a warmed refrigerant stream to a gas compression plant. The atmospheric gas stream, low-pressure gas stream, high-pressure gas stream, and warmed refrigerant stream are compressed and separated into a compressed gas stream and a condensate stream. The condensate stream is divided into an export condensate stream and the refrigerant stream. The compressed gas stream is chilled, via indirect heat exchange with the refrigerant stream, producing the warmed refrigerant stream.

Other aspects and advantages of the claimed subject matter will be apparent from the following description and the appended claims.

DETAILED DESCRIPTION

Figure 1:
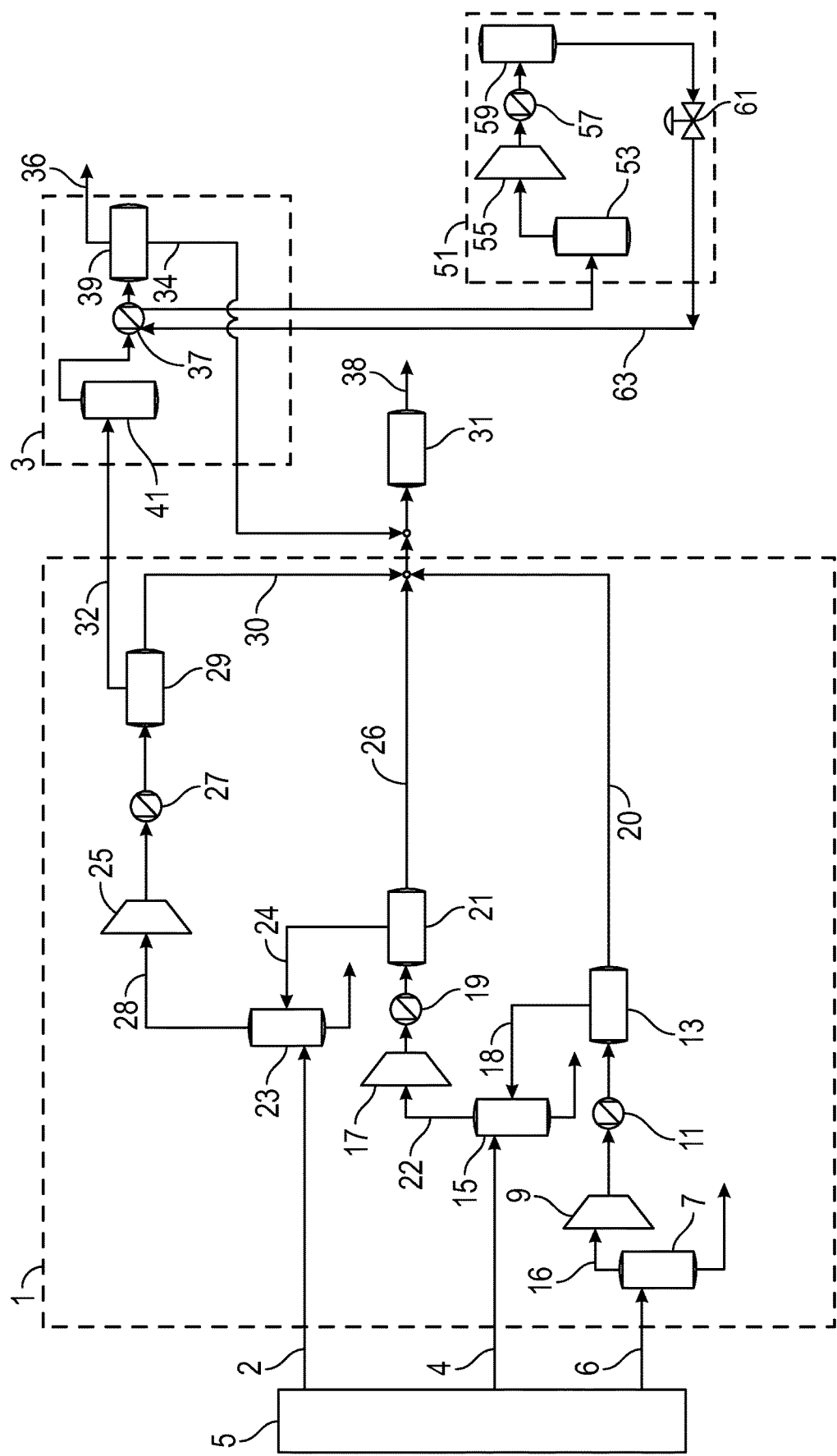
FIG. 1 is a depiction of a prior art system for chilling gas in a gas-oil separation plant.

In one aspect, embodiments disclosed herein relate to gas-oil separation plants. More specifically, embodiments herein relate to gas-oil separation plants for compressing and separating hydrocarbons, where produced liquids from the gas-oil separation plant are used as a refrigerant for facilitating cooling and separation of the feed hydrocarbons.

Closed loop refrigeration systems used in gas-oil separation plants, such as illustrated and described above with respect to FIG. 1, require significant energy, additional materials (refrigerant), and maintenance to operate. A closed loop system utilizes a separate refrigerant that cannot be recycled and further refined for export. Such a closed loop system also requires additional equipment, including compressors, heat exchangers, control valves, and knockout drums.

In contrast to the closed loop systems typically used in gas-oil separation plants, embodiments of gas-oil separation plants herein incorporate an open-loop system using condensate generated in the gas compression plant as a refrigerant. A portion of various condensate streams produced in the gas compression plant may be combined and used as a refrigerant, being expanded to reduce their temperature so that they may be utilized to provide necessary cooling to the gas chiller. The cooled two-phase condensate is then fed to the gas chiller to cool the inlet gas while the condensate is vaporized in the chiller. This material may then be recovered and introduced back into the gas compression plant for recovery as a condensate product.

The use of internally generated hydrocarbon streams reduces the need for a separate refrigeration system with a separate refrigerant such as freon or propane. In one or more embodiments, this may enable the gas-oil separation plant to meet the gas export specifications with less process equipment than would be necessary if a separate refrigeration system were used. Embodiments herein may thus minimize operating costs by eliminating one of the more challenging units to operate in the plant, namely the refrigeration plant including the refrigerant compressors, which often present further challenges during winter months when cooling demand is low. Embodiments herein may also result in improved condensate specification and stabilization, having a lesser content of light ends, such as C3 and lighter hydrocarbons and water, as well as improved gas specifications, having lesser content of heavy ends, such as C4 and heavier hydrocarbons.

Crude oil produced from various formations is a wide boiling mixture and includes light hydrocarbons (ethane, propanes, butanes) and heavier hydrocarbons (pentanes, hexanes, heptanes, octanes, nonanes, etc., up to gas oils, asphaltenes, etc). This crude oil is often initially processed in a crude processing plant to remove the light ends and produce a stabilized export crude having little to no propane and lighter hydrocarbons. For example, a crude processing plant may include a high-pressure separator, such as a high-pressure production trap operating at about 150 psig (100 psig to 500 psig), which may perform an initial separation of the crude, resulting in a high-pressure gas stream and a high-pressure liquid stream. The pressure of the liquid may then be let down, such as to 50 psig (30 psig to 165 psig), and separated to form a low-pressure gas stream and a low-pressure liquid stream. A further pressure reduction, such as to less than 5 psig (0 psig to 65 psig) and separation in a crude stabilizer, such as at atmospheric pressure, may result in an atmospheric gas stream and a stabilized crude oil product. The temperature of such feed streams may vary, and in some embodiments may range from ambient temperature to 150° F., for example.

Gas-oil separation plants according to embodiments herein include a gas compression plant, a flow system, and a gas dewpoint control plant. The gas compression plant may receive a high-pressure gas stream, a low-pressure gas stream, and an atmospheric gas stream, as well as a warmed refrigerant stream, compressing each in the gas compression plant to produce a condensate stream and a compressed gas stream. The condensate product stream may be divided by the flow system into an export condensate stream, recovered as a product, and a condensate refrigerant stream. The gas dewpoint control plant includes a gas chiller configured for cooling the compressed gas stream, by contacting via indirect heat exchange the compressed gas stream with the condensate refrigerant stream, producing a chilled gas product and a warmed condensate refrigerant stream fed. The warmed condensate refrigerant, as noted above, is then fed via a flow line to the gas compression plant for recovery of the hydrocarbons therein.

In one or more embodiments, one or more of the hydrocarbon gas streams received from the crude processing plant may be sour. That is, one or more of the hydrocarbon streams may comprise more than 10 ppm H2S. In other embodiments, the hydrocarbon stream may comprise from 10 ppm H2S to 50,000 ppm H2S.

One or more of the hydrocarbon streams received from the crude processing plant may also be "wet", meaning that the feed stream as provided to the gas-oil separation plant includes a mixture of liquid and vapor where water vapor is present in an amount above 7 lb/MMSCF of gas.

The gas compression plant according to embodiments herein may include a first compression train configured to receive an atmospheric gas stream from a crude processing plant, a second compression train configured to receive a low-pressure gas stream from the crude processing plant, and a third compression train configured to receive a high-pressure gas stream from the crude processing plant. Each of the first, second, and third compression trains may include a suction knockout drum, a compressor, an aftercooler, and a discharge knockout drum. A knockout drum (KOD) is a simple vessel for separating vapor and liquid in a stream having both vapor and liquid. A suction knockout drum (suction KOD) may be used to prevent liquid from entering a compressor, for example. A discharge knock-out drum may be used to separate condensate, liquid resulting from compression in the compressor and cooling in the aftercooler, from compressed gases resulting from the compression. Each compression train thus outputs a compressed gas stream and a liquid condensate stream.

For example, the first compression train, processing the atmospheric gas stream, may compress the atmospheric gas in the atmospheric compressor to about 50 to 60 psig. Discharge gas from the atmospheric compressor is cooled in the after cooler to 90-120° F. to condense a portion of the heavy hydrocarbons such as C3H8, C4H10, C5H12, C6+ from the compressed gas. Hydrocarbon condensate is then separated in the atmospheric compressor discharge knockout drum.

A flow line may be provided for feeding the compressed gas from the atmospheric compressor discharge knockout drum to the suction knockout drum of the second compression train, thus processing the compressed atmospheric gas product along with the low-pressure gas feed stream from the crude processing plant in the second compression train. In the second compression train, the LP compressor compresses the combined gases to 150-160 psig. The discharge gas from LP compressor is then cooled in the after cooler to 90-120° F. to condense heavy hydrocarbons such as C3H8, C4H10, C5H12, C6+ from the gas. Hydrocarbon condensate is then separated in the LP compressor discharge Knockout Drum (KOD).

A flow line may be provided for feeding the compressed gas from the LP compressor discharge knockout drum to the suction knockout drum of the third compression train, thus processing the compressed LP gas product along with the high-pressure gas feed stream from the crude processing plant in the third compression train. In the third compression train, the HP compressor compresses the gas to 450 to 500 psig. The discharge gas from the HP compressor is cooled in the after cooler to 90-120° F. to condense heavy hydrocarbons such as C3H8, C4H10, C5H12, C6+ from the gas. Hydrocarbon condensate is then separated in the HP compressor discharge Knockout Drum (KOD).

Compressed gas recovered from the HP compressor discharge KOD is then fed to the gas dewpoint control plant to provide a compressed gas product that meets pipeline specifications for hydrocarbon dew point, reducing its hydrocarbon dew point to below 80° F., for example, depending on the ambient condition, to prevent hydrocarbon condensation and liquid accumulation in the gas pipelines during transportation or during cooling in the downstream equipment. In the gas dewpoint control plant, a portion of the condensate produced during gas compression and dewpoint control, may be used as a refrigerant for cooling the compressed gas in a gas chiller. The liquid condensate is allowed to expand before entering the gas chiller, where the pressure drop will lead to vaporizing light gases, such as methane, ethane, H2S, and CO2, in the condensate. The cooled two-phase condensate is then fed to the gas chiller to cool the inlet gas to a desired temperature while the condensate is vaporized in the chiller. The chilled gas may be fed to a chiller knockout drum, providing for recovery of a compressed gas product stream, an export gas meeting pipeline specifications, and a chiller condensate stream.

The warmed condensate refrigerant may then be fed to the gas compression plant for further processing. In some embodiments, the warmed condensate refrigerant or a portion thereof may be fed to a suction knockout drum of one or more of the separation trains, may be fed to a discharge knockout drum of one or more of the separation trains, or a combination thereof.

Various embodiments are envisioned for the flow system providing the condensate refrigerant stream. In some embodiments, the condensate from each of the discharge knockout drums and the chiller knockout drum may be combined, forming a mixed condensate stream. In some embodiments, the condensates from each of the discharge knockout drums may be accumulated in a condensate collection drum, providing a volume of liquid condensate for gas chiller refrigeration. Excess condensate accumulated in the condensate collection drum, that which is not used for gas chiller refrigeration, may be recovered as a condensate product stream. In other embodiments, the flow system may include a condensate collection drum also receiving condensate from one or more of the suction knockout drums.

In yet other embodiments, the flow system may include a condensate collection drum receiving condensate from the first and second compression train discharge knockout drums and the suction knockout drums from each of the first, second, and third compression train. The flow system may further include a condensate collection and distribution system receiving condensate from the chiller condensate knockout drum and the third compression train discharge knockout drum. A portion of the condensate in the condensate collection and distribution system may be used as a refrigerant in the gas chiller, and a remaining portion of the condensate may be provided to the condensate collection drum.

In some embodiments, the condensate from each of the suction knockout drums is recovered as a product and may be exported to downstream plants for further processing. In other embodiments, as noted above, condensate from one or more of the suction knockout drums may be combined and accumulated in the condensate collection drum.

The gas-oil separation plant or other portions of the overall plant may include other cooling demands. In such embodiments, a portion of the condensate accumulated in the condensate collection drum or in the condensate collection and distribution system may be used as a refrigerant to provide the needed cooling. Following cooling, the resulting warmed condensate refrigerant streams may be fed to a suction knockout drum of one or more of the compression trains. The suction drum to which the warmed condensate is fed may depend upon the pressure of the warmed refrigerant stream, desirably feeding a low-pressure warmed refrigerant to the first compression train, while a higher-pressure warmed refrigerant may be fed to the second or third compression trains. Similarly, the warmed refrigerant from the gas chiller may be fed to an appropriate suction knockout drum based on the pressure of the warmed refrigerant stream.

In some embodiments, the gas-oil separation plant may include systems for the reduction or removal of water contained in the feedstocks. In one or more embodiments, the gas dewpoint control plant may include a dehumidifier configured to receive the compressed gas stream from the third separation train discharge knockout drum. The dehumidifier, such as a triethylene glycol contactor or other dehumidifiers known in the art, may be used to remove water from the compressed gas stream. The dehumidified gas stream may then be fed to the gas chiller for dewpoint control. In yet other embodiments, the dehumidifier may be associated with the third compression stream, dehumidifying the high-pressure gas feed stream, the gas from the second compression train discharge knockout drum, the gas from the third compression train suction knockout drum, or a combination of two or more of these feed streams, such as the high-pressure gas feed stream and the gas from the second compression train discharge knockout drum.

In one or more embodiments, the condensate may comprise hydrocarbons containing at least 3 carbon atoms. The C3+ content in the condensate stream may have a range with an upper limit of any of 90% or 80%, and a lower limit of 50% or 60% in one or more embodiments. In some embodiments, the operating pressure of the condensate refrigerant stream, following pressure reduction upstream of the gas chiller, is within the range from 0 psia to 150 psig. In one or more embodiments, the temperature of the condensate refrigerant stream, following pressure reduction upstream of the gas chiller, is in the range from 50° F. to 70° F. The percentage of condensate that may be recycled may vary based on the cooling requirements; a greater percentage of condensate may be recycled with greater cooling requirements, with anywhere from 0 to 100% able to be recycled.

In one or more embodiments, the refrigerant streams are used for cooling the gas before and after the dehydration system. In other embodiments, a hydrocarbon stream must be cooled prior to entering the dehydration system to avoid hydrate formation. In one or more embodiments, the maximum inlet temperature to the dehydration system is about 90° F. to avoid hydrate formation, which may necessitate cooling of the inlet gas prior to entering the dehydration system. In some embodiments, material in the export pipeline must be cooled as well to condense heavier hydrocarbons for export. In one or more embodiments, the export gas for feed to the pipeline is at a temperature of about 50° F. (45° F. to 80° F.), and as noted above, may depend upon the ambient conditions so as to meet dewpoint requirements.

One or more of the hydrocarbon streams may be dehydrated using a dehydration system. This system removes water and, in one or more embodiments, may remove other contaminants. The dehydration system may include a TEG Contactor, which utilizes triethylene glycol to absorb water from the hydrocarbon stream. Water is removed to avoid hydrate formation and corrosion in the export gas pipeline systems or downstream equipment. In one or more embodiments, heat is utilized to remove water from the triethylene glycol in order to recycle the triethylene glycol.

In one or more embodiments, an advanced process control (APC) system using model predictive controllers in combination with machine learning and artificial intelligence may be used to monitor and control the overall cooling requirements in the dewpoint control plant and/or the gas compression plant while manipulating the condensate flowrates. In some embodiments, the prediction models for the process variables may be created using mechanistic model or by experiment during or by using the artificial intelligence of the historical data. Also, the APC may be utilized to avoid violating the hard constraints like hydrate formation of the gas or the power limits of the compressor motors. In one or more embodiments, controlled variables may include the gas chiller outlet gas temperature, the gas chiller outlet condensate temperature, and the outlet temperatures of the refrigerant from the other cooling demands.

In some embodiments, the control system may be configured to receive temperature measurements from temperature sensors disposed on flowlines associated with each of the cooled and compressed streams respectively downstream of each aftercooler. Temperature measurements may also be received from flow lines on the export gas product stream downstream of the gas chiller. When additional cooling is present, temperature measurements may further be provided from flow streams measuring a temperature of the warmed condensate refrigerant downstream of the various heat exchangers receiving condensate refrigerant. Using these temperature measurements, the control system may be configured to control a temperature of the chilled compressed gas stream (the compressed, dehydrated, and dewpoint-controlled product stream), as well as the temperature of any chilled process streams downstream of any additional cooling heat exchangers. To achieve the desired temperature control, the control system may be configured to control a flow rate of the refrigerant stream fed to the gas chiller, control a flow rate of the condensate refrigerant fed to heat exchangers for the additional cooling requirements, as well as the excess condensate fed to the condensate collection drum from the condensate collection and distribution system and/or the flow rate of condensate product.

Figure 2:
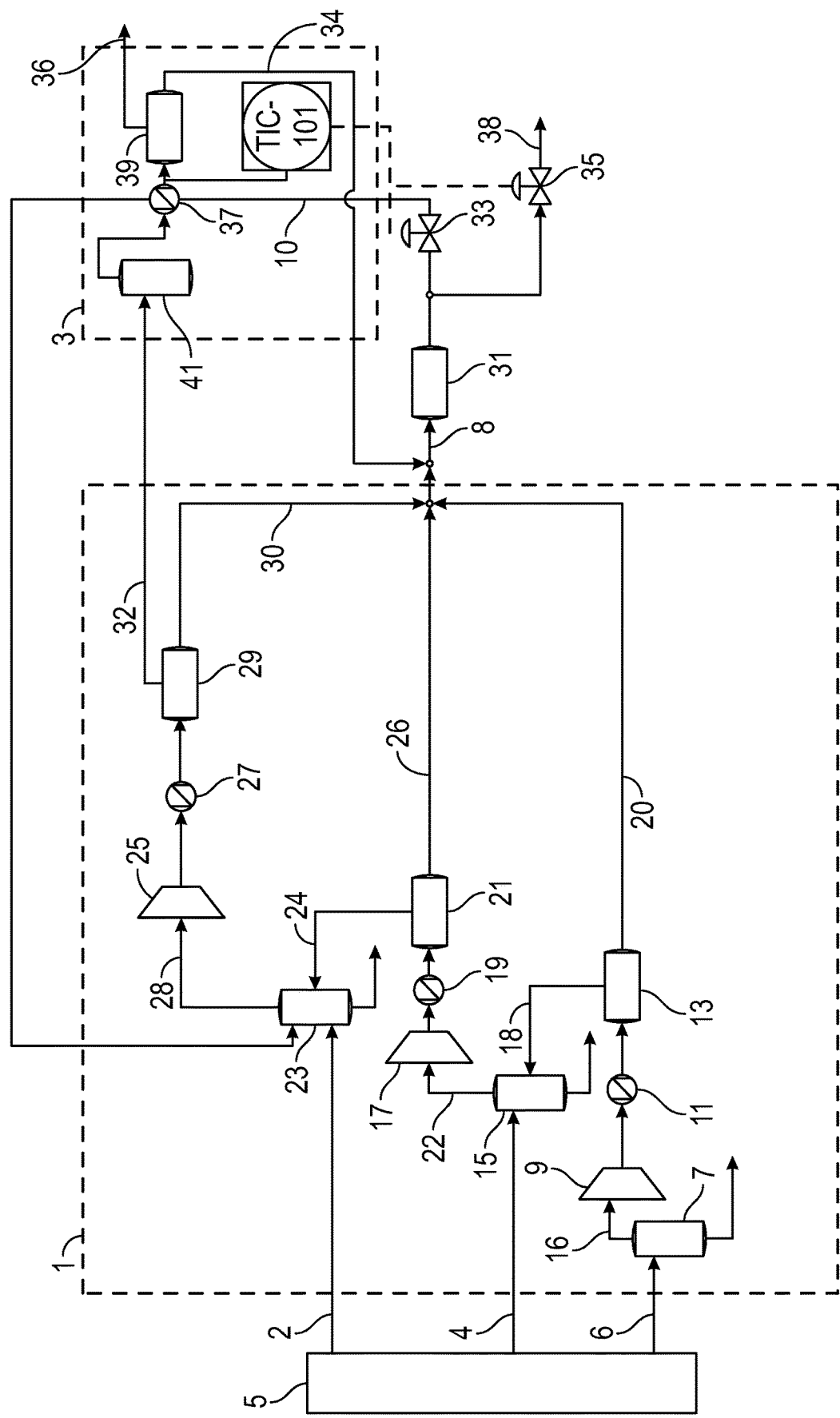
FIG. 2 is a simplified flow diagram of a process for chilling various streams in a gas-oil separation plant according to embodiments herein.
Figure 3:
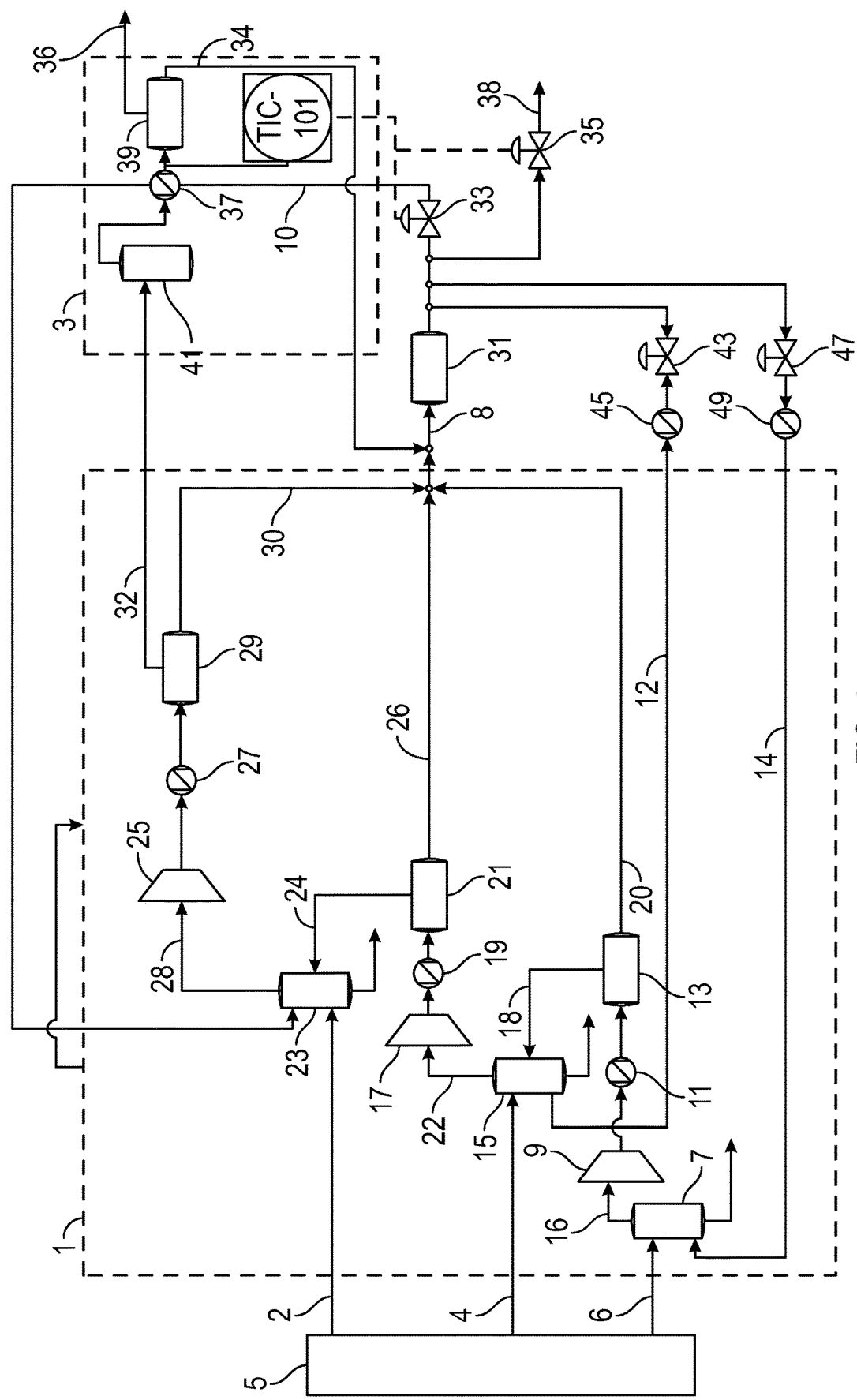
FIG. 3 is a simplified flow diagram of a process for chilling various streams in a gas-oil separation plant according to embodiments herein.
Figure 4:
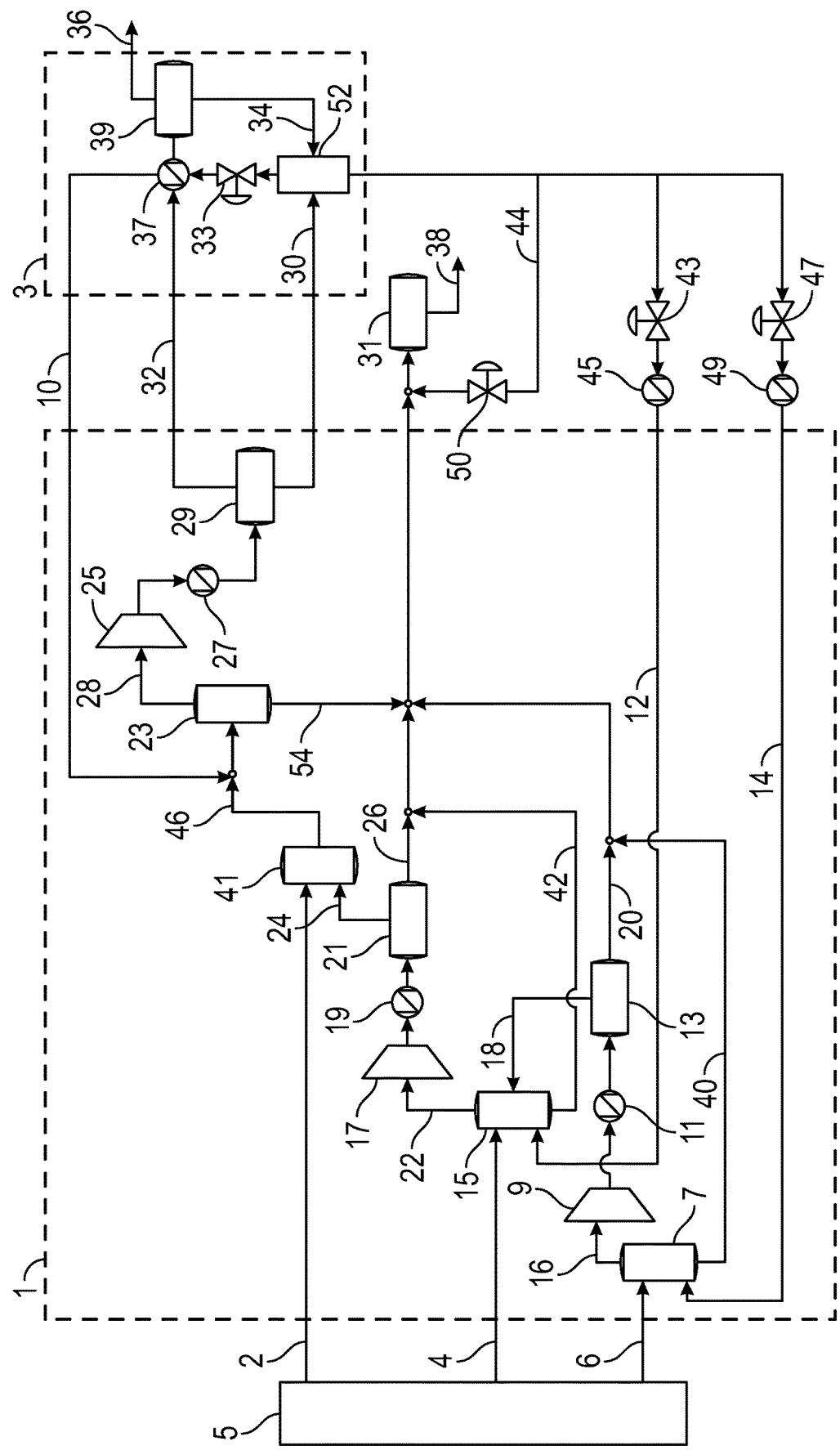
FIG. 4 is a simplified flow diagram of a process for chilling various streams in a gas-oil separation plant according to embodiments herein.

Specific embodiments utilizing one or more of the above-described flow schemes related to the condensate collection and condensate refrigerant system are illustrated in FIGS. 2-4, described below.

FIG. 2 is a simplified process flow diagram of a gas-oil separation plant according to embodiments herein. A gas compression plant 1 is utilized to compress the output streams from a crude processing plant 5. Here, a high-pressure (HP) gas stream 2, a low-pressure (LP) gas stream 4, and an atmospheric (ATM) gas stream 6 are inputs into the gas compression plant 1. The ATM gas stream 6 is sent into the atmospheric suction knockout drum 7, the gas output of which, ATM compressor feed 16, is sent into the atmospheric compressor 9 and compressed to 50-60 psig. The compressor discharge is then cooled in the after cooler 11 to 90-120° F. to condense the heavy hydrocarbon, such as $C_3H_8$, $C_4H_{10}$, $C_5H_{12}$, and C6+, from the compressed gas. The cooled and compressed ATM compressor discharge stream is then separated in the atmospheric compressor discharge knockout drum (KOD) 13 to recover ATM compressor condensate 20 and ATM compressor gas 18. ATM compressor condensate 20 is mixed with several other streams: LP compressor condensate 26, HP compressor condensate 30, and dewpoint KOD condensate 34 to become auxiliary stream 8.

The gas from the atmospheric compressor discharge knockout drum 13, ATM compressor gas 18, is mixed with the low-pressure (LP) gas stream 4 in the suction knockout drum 15, the gas discharge of which, LP compressor feed 22, is fed to the low-pressure (LP) compressor 17. The LP compressor 17 compresses the gas to 150-160 psig. The discharge gas 22 from LP compressor 17 is then cooled in the after cooler 19 to 90-120° F. to condense heavy hydrocarbons such as $C_3H_8$, $C_4H_{10}$, $C_5H_{12}$, and C6+ from the gas. LP compressor condensate 26 is then separated from LP compressor gas 24 in the LP compressor discharge knockout drum (KOD) 21. The condensate 26 is combined with ATM compressor condensate 20, dewpoint KOD condensate 34, and HP compressor condensate 30, forming auxiliary stream 8, which is pumped to the shipping Condensate KOD 31.

The gas from the knockout drum 21, LP compressor gas 24, is fed to suction knockout drum 23, where it mixes with the high-pressure gas stream 2. The gas discharge from suction knockout drum 23, HP compressor feed 28 is fed into high-pressure (HP) compressor 25. The HP compressor 25 compresses the gas to 450 to 500 psig. The discharge gas from HP compressor 25 is then cooled in the after cooler 27 to 90-120° F. to condense heavy hydrocarbon such as $C_3H_8$, $C_4H_{10}$, $C_5H_{12}$, and C6+ from the gas. HP compressor discharge knockout drum (KOD) 29 separates the compressed and cooled stream into HP compressor condensate 30 and HP compressor gas 32. The condensate 30 is combined with ATM compressor condensate 20, LP compressor condensate 26, and dewpoint KOD condensate 34, forming auxiliary stream 8, which is pumped to the shipping Condensate KOD 31.

HP compressor gas 32 from the HP condensate KOD 29 is fed to gas dehydration unit 41 in the gas dehydration and dewpoint control plant 3 to remove water to a level sufficient to avoid hydrate formation and corrosion in the export gas pipeline systems or downstream equipment. The gas from the dehydration unit is then fed to a dewpoint control unit including gas chiller 37 and dewpoint KOD 39 to reduce its hydrocarbon dew point to below 80° F., or other suitable temperatures depending on the ambient condition, to prevent hydrocarbon condensation and liquid accumulation in the gas pipelines during transportation or during cooling in downstream equipment. Here, HP compressor gas 32 is cooled in the gas chiller 37, before being sent to a knockout drum 39. The dewpoint KOD condensate 34 from the knockout drum 39 is mixed with HP compressor condensate 30, LP compressor condensate 26, and ATM compressor condensate 20, forming auxiliary stream 8, before being sent into the condensate collection knockout drum 31. Gas from knockout drum 39, export gas 36, is recovered as a compressed gas product.

A portion of the condensate from condensate collection knockout drum 31 is sent through a pressure letdown control valve (PLCV) 33, becoming condensate refrigerant stream 10. A remainder of the condensate from the condensate collection knockout drum 31 is sent through the excess condensate valve 35 for export as export condensate 38. The refrigerant stream 10 enters the gas chiller 37, where it is utilized to cool the HP compressor gas 32 from the TEG Contactor 41. The warmed refrigerant stream 10 exits the gas chiller 37 and is fed to the HP suction knockout drum 23 for further processing, vapors of which may be processed in the HP compressor 25 as vapor in HP compressor feed 28, and liquids of which may be recovered and exported as condensate.

In one or more embodiments, the temperature of the HP compressor gas 32 from the gas chiller 37 outlet may be used to control the PLCV 33 opening and the excess condensate valve 35 for export as export condensate 35. The gas chiller temperature indicator controller (TIC) 101 receives the temperature information from the HP compressor gas and may open the PLCV 33 to allow more cooling if needed and close the valve for lower cooling demand.

In some embodiments, operating parameters of the various vessels for embodiments of the system as illustrated in FIG. 2 may be as follows in Table 1.

TABLE 1

Operating parameters of vessels for embodiments of the system illustrated in FIG. 2.

| Component | Temperature, ° F. | Pressure, Psig |
|---|---|---|
| Atmospheric Compressor Suction Drum 7 | 90-130 | 0.7-5 |
| Atmospheric Compressor Discharge Drum 13 | 90-130 | 35-65 |
| Low pressure (LP) Compressor Suction Drum 15 | 90-130 | 30-60 |
| Low pressure (LP) Compressor Discharge Knockout Drum 21 | 90-130 | 135-165 |
| High-pressure (HP) Compressor Suction Drum 23 | 90-130 | 130-160 |

TABLE 1-continued

Operating parameters of vessels for embodiments of the system illustrated in FIG. 2.

| Component | Temperature, ° F. | Pressure, Psig |
|---|---|---|
| High-pressure (HP) Compressor Discharge Knockout Drum 29 | 90-130 | 400-500 |
| TEG Contactor 41 | 90-130 | 400-500 |
| Export Condensate Collection Drum 31 | 90-100 | 400-600 |
| Gas Chiller Condensate Knockout Drum 39 | 75 | 400-600 |

While illustrated in FIG. 2 as returning the warmed refrigerant to HP compressor train suction knockout drum 23, other embodiments herein include return of the warmed refrigerant to the LP compressor train suction knockout drum 15. Still other embodiments include return of the warmed condensate refrigerant to the ATM gas compression train suction knockout drum 7.

As illustrated in FIG. 2, condensate streams may be recovered from each of suction knockout drums 7, 15, 23. Such condensates may be separately or collectively recovered as condensate product streams and may be combined in some embodiments with export condensate 38 to from a combined condensate product stream.

FIG. 3 is a simplified process flow diagram of a gas-oil separation plant according to embodiments herein, where like numerals represent like parts. In these embodiments, the processing plant may include additional cooling demands, represented by heat exchangers 45 and 49. As with the embodiments of FIG. 2, a portion of the condensate is recovered as condensate product stream 38. A portion of the condensate is used as a condensate refrigerant stream 10, providing cooling for the gas chiller 37. A portion of the condensate may also be used as a second condensate refrigerant stream 12, used for providing refrigerant to heat exchanger 45, and yet another portion may be used as a third condensate refrigerant stream 14, used for providing refrigerant to heat exchanger 49. Similar to the various embodiments of FIG. 2, the resulting warmed refrigerant streams may individually or collectively be returned to any or all of suction knockout drums 7, 15, 23 for further processing and recovery of the compressed gas, condensate, and condensate refrigerant. In addition, as in FIG. 2, the amount of cooling may be controlled in some embodiments via a gas chiller temperature indicator controller (TIC) 101, which would monitor HP compressor gas 32 temperature from the gas chiller 37 outlet to control the PLCV 33 and the excess condensate valve 35.

FIG. 4 is simplified process flow diagram of a gas-oil separation plant according to embodiments herein, where like numerals represent like parts. In these embodiments, a gas compression plant 1 is utilized to compress the output streams from a crude processing plant 5. Here, a high-pressure (HP) gas stream 2, a low-pressure (LP) gas stream 4, and an atmospheric (ATM) gas stream 6 are inputs into the gas compression plant 1. The ATM gas stream 6 is sent into the atmospheric suction knockout drum 7, where it is separated into ATM compressor feed 16 and ATM suction KOD condensate 40. ATM compressor feed 16 is sent into the atmospheric compressor 9 and compressed to 50-60 psig. Discharge gas from the atmospheric compressor 9 is cooled in the after cooler 11 to 90-120° F. to condense the heavy hydrocarbons such as $C_3H_8$, $C_4H_{10}$, $C_5H_{12}$, and C6+ from the compressed gas before entering the atmospheric compressor discharge knockout drum (KOD) 13 where the ATM compressor gas 18 is then separated from ATM compressor condensate 20. The ATM compressor condensate 20 from the atmospheric compressor discharge knockout drum 13 is mixed with ATM suction KOD condensate 40, LP suction KOD condensate 42, LP compressor condensate 26, HP suction knockout drum condensate 54, and excess condensate 44, before being sent to shipping condensate knockout drum 31, the condensate of which is exported as export condensate 38.

The ATM compressor gas 18 from the ATM compressor discharge knockout drum 13 is mixed with the low-pressure (LP) gas stream 4 in the suction knockout drum 15, the gas discharge of which, LP compressor feed 22, is fed to the low-pressure (LP) compressor 17. The LP compressor 17 compresses the gas to 150-160 psig. The discharge gas from LP compressor is then cooled in the after cooler 19 to 90-120° F. to condense the heavy hydrocarbons such as C3H8, C4H10, C5H12, and C6+ from the gas. LP compressor gas 24 and LP compressor condensate 26 are then separated in the LP compressor discharge knockout drum (KOD) 21. LP suction KOD condensate 42 from the LP suction knockout drum 15 is combined with ATM suction KOD condensate 40, ATM compressor condensate 20, LP compressor condensate 26, HP suction KOD condensate 54, and excess condensate 44, before being sent to the shipping condensate KOD 31, the condensate of which is exported as export condensate 38.

LP compressor gas 24 from the LP compressor discharge knockout drum 21 is fed to the TEG Contactor 41, where it mixes with the high-pressure gas stream 2. TEG contactor output 46 from the TEG Contactor 41 is fed to HP suction knockout drum 23 along with a condensate refrigerant stream 10. HP suction KOD condensate 54 from the HP compressor suction knockout drum 23 is mixed with ATM suction KOD condensate 40, ATM compressor condensate 20, LP suction KOD condensate 42, LP compressor condensate 26, and excess condensate 44 before being sent to shipping condensate knockout drum 31, the condensate of which is exported as export condensate 38.

Gas output from suction knockout drum 23, HP compressor feed 28, is fed into the high-pressure (HP) compressor 25. The HP compressor 25 compresses the gas to 450 to 500 psig. The discharge gas from HP compressor 25 is cooled in the after cooler 27 to 90-120° F. to condense the heavy hydrocarbons such as C3H8, C4H10, C5H12, and C6+ from the gas. The HP compressor stream 28 is separated into the HP compressor condensate 30 and the HP compressor gas 32 in the HP compressor discharge knockout drum (KOD) 29. The HP compressor condensate 30 from the HP compressor discharge knockout drum 29 is fed to the cooling condensate collection and distribution system 52.

HP compressor gas 32 from the HP condensate KOD 29 is fed to the gas dehydration and dewpoint control unit 3 to reduce its hydrocarbon dew point to below 80° F., the ultimate temperature depending on the ambient condition to prevent hydrocarbon condensation and liquid accumulation in the gas pipelines during transportation or during cooling in the downstream equipment. Here, HP compressor gas 32 is cooled in the gas chiller 37, before being sent to a knockout drum 39. Gas from knockout drum 39, export gas 36, is exported. Dewpoint knockout drum condensate 34 from the knockout drum 39 is fed into cooling condensate collection and distribution system 52, as is the HP Compressor Condensate 30. From the cooling condensate collection and distribution system 52, condensate is sent through either PLCV 1—33, PLCV 2—43, PLCV 3—47, becoming the condensate refrigerant stream 10, second condensate refrigerant stream 12, and third condensate refrigerant stream 14. Excess condensate 44 from the cooling condensate collection and distribution 52, is sent through an excess condensate valve 50 to condensate collection knockout drum 31 for export, combining with HP suction KOD condensate 54, LP compressor condensate 26, LP suction knockout drum condensate 42, ATM compressor condensate 20, and ATM suction KOD condensate 40. Cooling condensate collection and distribution system 52 may include a tank for accumulating a volume of condensate along with other auxiliary equipment as may be required. The cooling condensate collection and distribution system 52 may be a three-phase horizontal or vertical vessel. Gas may be withdrawn from the top of the vessel, water may be withdrawn from the boot, and condensate may be withdrawn from the side above the water level.

In one or more embodiments, the temperature of the HP compressor gas 32 from the gas chiller 37 outlet may be used to control the PLCV 1—33 opening and the excess condensate valve 50 for export as export condensate 38. The gas chiller temperature indicator controller (TIC) 102 may open the PLCV 1—33 to allow more cooling if needed and close the valve for lower cooling demand.

In some embodiments, operating parameters of the various vessels for embodiments of the system as illustrated in FIG. 4 may be as follows in Table 2.

TABLE 2

Operating parameters of vessels for embodiments of the system illustrated in FIG. 4.

| Component | Temperature, ° F. | Pressure, Psig |
|---|---|---|
| Atmospheric Compressor Suction Drum 7 | 90-130 | 0.7-5 |
| Atmospheric Compressor Discharge Drum 13 | 90-130 | 35-65 |
| Low-pressure (LP) Compressor Suction Drum 15 | 90-130 | 30-60 |
| Low pressure (LP) Compressor Discharge Knockout Drum 21 | 90-130 | 135-165 |
| High-pressure (HP) Compressor Suction Drum 23 | 90-130 | 130-160 |
| High-pressure (HP) Compressor Discharge Knockout Drum 29 | 90-130 | 400-500 |
| TEG Contactor 41 | 90-130 | 130-160 |
| Export Condensate Collection Drum 31 | 90-100 | 400-600 |
| Gas Chiller Condensate Knockout Drum 39 | 75 | 400-600 |

Figure 5:
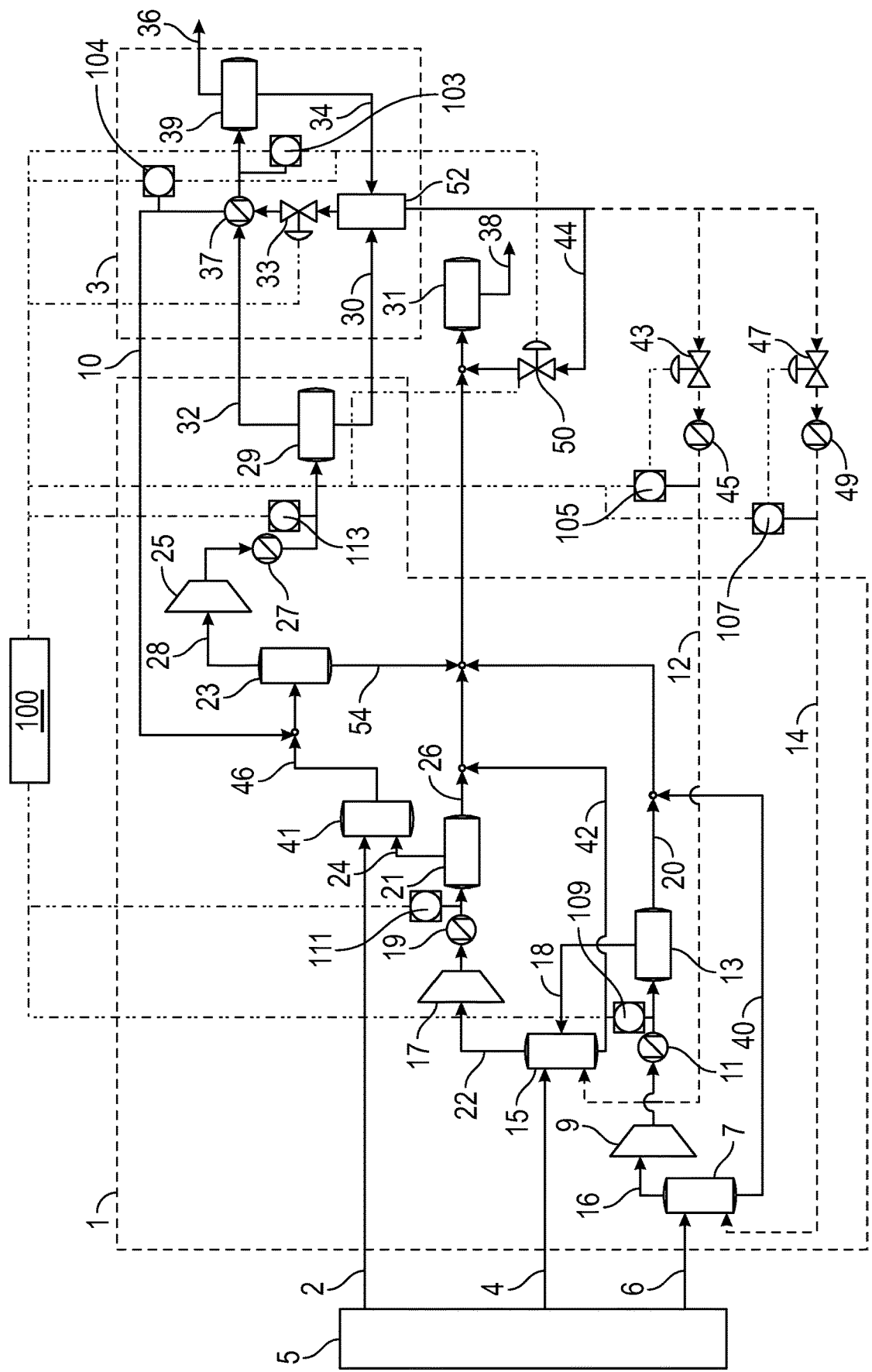
FIG. 5 is a simplified diagram of process controllers for controlling the processes of FIG. 4 according to embodiments herein.

FIG. 5 is a flow diagram showing embodiments of process controllers for controlling the processes of FIG. 4. In these embodiments, the layout of the flow system is the same as in the embodiments of FIG. 4. Advanced process controllers (APC) 100 may be used to monitor and control the cooling requirements while manipulating the condensate flow rates.

In these embodiments, the temperature of the condensate refrigerant stream 10 at the outlet of the gas chiller 37 and the temperature of the HP compressor gas 32 at the outlet of the gas chiller 37 may be measured with TIC2—104 and TIC1—103 respectively and used in concert with the cooling demand and the temperature of the second condensate refrigerant stream—12, measured by TIC3—105, and the temperature of the third condensate refrigerant stream—14, measured by TIC4—107, to control the excess condensate valve 50, which may open more for low cooling demand. The temperature measured by TIC3—105 and the temperature measured by TIC4—107 may also be used to control PLCV 2—43 and PLCV 3—47 respectively, both of which may open more for a higher cooling demand. PLCV 1—33 may also open more for higher cooling demand. The temperature of the ATM after cooler 11 outlet, the LP after cooler 19 outlet, and the HP after cooler 27 outlet may be measured by TIC5—109, TIC6—111, and TIC7—113 respectively to evaluate the cooling demand. The temperature of the ATM after cooler 11 outlet, the LP after cooler 19 outlet, and the HP after cooler 27 outlet may be manipulated.

The APC 100 may be used to avoid violating the hard constraints of the system. The system is constrained by the temperature at which condensate forms hydrate, the ATM compressor 9 motor horsepower, the LP compressor 17 motor horsepower, and the HP compressor 25 motor horsepower.

As noted above, the APC 100 may use model predictive controllers, in combination with machine learning and artificial intelligence, may be used to monitor and control the overall cooling requirements in the dewpoint control plant and/or the gas compression plant while manipulating the condensate flowrates. In some embodiments, the prediction models for the process variables may be created using mechanistic model or by experiment during or by using the artificial intelligence of the historical data. Also, the APC may be utilized to avoid violating the hard constraints like hydrate formation of the gas or the power limits of the compressor motors. In one or more embodiments, controlled variables may include the gas chiller outlet gas temperature, the gas chiller outlet condensate temperature, and the outlet temperatures of the refrigerant from the other cooling demands.

In some embodiments, APC 100 may be configured to receive temperature measurements from temperature sensors disposed on flowlines associated with each of the cooled and compressed streams respectively downstream of each aftercooler. Temperature measurements may also be received from flow lines on the export gas product stream downstream of the gas chiller. When additional cooling is present, temperature measurements may further be provided from flow streams measuring a temperature of the warmed condensate refrigerant downstream of the various heat exchangers receiving condensate refrigerant. Using these temperature measurements, the control system may be configured to control a temperature of the chilled compressed gas stream (the compressed, dehydrated and dewpoint controlled product stream), as well as the temperature of any chilled process streams downstream of any additional cooling heat exchangers. To achieve the desired temperature control, the control system may be configured to control a flow rate of the refrigerant stream fed to the gas chiller, control a flow rate of the condensate refrigerant fed to heat exchangers for the additional cooling requirements, as well as the excess condensate fed to the condensate collection drum from the condensate collection and distribution system and/or the flow rate of condensate product.

Embodiments herein may provide for an export compressed gas product having a water content of less than 7 pounds per million standard cubic feet. Further, embodiments herein may flexibly provide for the compressed gas product stream having a dewpoint, depending upon ambient temperatures, in the range from 10° F. to 80° F., meeting pipeline specifications.

As described above, embodiments herein may provide for use of produced condensate as a refrigerant for gas dewpoint control and other refrigeration needs within the plant. The use of condensate refrigerant according to embodiments herein allow the gas-oil separation plant to meet gas export specifications with a smaller number of process equipment, lower capital expenses, and lower operating expenses due to the absence of the closed-loop refrigeration system. Embodiments herein may also produce a higher quality condensate compared to a conventional gas-oil separation plant having a closed-loop refrigeration system, as will be illustrated by the following examples. The condensate product may have a lower C3− content while the gas product may have a lower C4+ content as compared to the product streams resulting from a conventional gas-oil separation plant.

EXAMPLES

Comparative Example 1

Comparative Example 1 is a configuration according to the embodiment of FIG. 1 where propane is utilized as the refrigerant. Process simulation was conducted in HYSYS.

Example 1

Example 1 is a configuration according to the embodiments of FIG. 2. Here, 66.6% of the auxiliary stream is used as a condensate refrigerant stream with fixed temperatures and a set inlet flow rate. Process simulation was conducted in Aspen HYSYS V12.1, using VLE Peng Robinson fluid package. A comparison between the simulations for Example 1 and Comparative Example 1 are displayed in Table 3 below.

TABLE 3

Comparison in gas and condensate streams and power consumption between propane refrigeration loop (Comparative Example 1) and internally generated condensate refrigerant stream (Example 1)

| Configuration | Comparative Example 1 (FIG. 1) - with propane loop | Example 1 (FIG. 2) - condensate refrigerant stream fed to HP gas compression train |
|---|---|---|
| Streams | | |
| Recycled Condensate, % | 0 | 66.6 |
| Export Gas, Million standard cubic feet per day (MMSACFD) | 78.3 | 88.4 |
| Export Condensate, Barrel/day | 53434 | 47546 |
| Export Condensate, [lb/ft$^3$] | 36.1 | 36.6 |
| Export Condensate Component Flow, lb/hr | | |
| $H_2O$ | 239.406109 | 187.6757193 |
| $N_2$ | 319 | 169 |
| $H_2S$ | 22066 | 14828 |
| $CO_2$ | 14161 | 8225 |
| Methane | 7380 | 4029 |
| Ethane | 27191 | 17887 |
| Propane | 99165 | 82505 |
| I-Butane | 25754 | 24634 |
| n-Butane | 110174 | 108532 |
| I-Pentane | 37127 | 37587 |
| n-Pentane | 56538 | 57195 |
| Hexane+ | 42469 | 42598 |
| Power Consumption | | |
| Atm Compressor - Power [hp] | 11675 | 11675 |
| LP Compressor - Power [hp] | 12000 | 12000 |
| HP Compressor - Power [hp] | 11816 | 15010 |
| Temperature, Gas chiller Outlet, ° F. | 75 | 75 |
| Propane Compressor, HP | 3355.0 | 0.0 |
| Chiller Condensate outlet temperature, ° F. | | 98.9 |

A barrel here is defined as 42 US gallons (0.159 m3). In Example 1, additional C5+ was removed from the export gas, and additional C4, C3, C2, C1, CO2, H2S, and N2 were removed from the export condensate in Example 1 with the condensate recycle when compared with Comparative Example 1. Removal of the light hydrocarbon and contaminants from the condensate stabilizes the condensate and leads to an increase in the export gas by 10.1 MMSCFD, with the amount of condensate being reduced by 4883 barrels/day. The removal of heavy ends from the export gas improves the specifications of the gas. Higher C5+ in the export condensate reduces hydrocarbon condensation in gas pipelines and improves the condensate export specifications. The water content of the condensate was reduced by 21.6%, which reduces hydrate formation and corrosion in downstream piping and equipment. Improved specifications for the export condensate and export gas result from the recycle of condensate through to the HP suction knockout drum, enabling some of the material in the refrigerant stream to undergo further separation. In addition, there are power savings when comparing Comparative Example 1 with Example 1, with the increase in power use by the HP compressor in Example 1 being more than offset by the decrease in power use by the removal of the propane compressor. The use of the internally generated streams removes the need for a separate cooling plant for this process, removing the need for operation and maintenance of the propane refrigeration system.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

When the words "approximately" or "about" are used, these terms may mean that there can be a variance in value of up to ±10%, of up to 5%, of up to 2%, of up to 1%, of up to 0.5%, of up to 0.1%, or up to 0.01%.

Ranges may be expressed as from about one particular value to about another particular value, inclusive. When such a range is expressed, it is to be understood that another embodiment is from the one particular value to the other particular value, along with all particular values and combinations thereof within the range.

What is claimed:

1. A process for gas oil separations, comprising:
   feeding an atmospheric gas stream, a low-pressure gas stream, a high-pressure gas stream, and a warmed refrigerant stream to a gas compression plant;
   compressing and separating the atmospheric gas stream, low-pressure gas stream, high-pressure gas stream, and warmed refrigerant stream into a compressed gas stream and a condensate stream;
   dividing the condensate stream into an export condensate stream and a refrigerant stream; and
   chilling the compressed gas stream in a gas dewpoint control plant, via indirect heat exchange with the refrigerant stream, producing the warmed refrigerant stream.

2. The process of claim 1, wherein a first compression train receives an atmospheric gas stream from a crude processing plant, a second compression train receives a low-pressure gas stream from the crude processing plant, and a third compression train receives a high-pressure gas stream from the crude processing plant, wherein each of the first, second, and third compression trains comprises a suction knockout drum, a compressor, an aftercooler, and a knockout drum, wherein:
   each suction knockout drum receives and separates a respective feed stream into a vapor stream and a liquid knockout stream;
   each compressor receives and compresses the vapor stream received from the associated suction knockout drum;
   each aftercooler cools a compressed vapor stream received from the associated compressor; and
   each knockout drum receives a cooled and compressed stream from the associated aftercooler and outputs a compressed gas stream and a liquid condensate stream;
   wherein at least one of the suction knockout drums receives the warmed refrigerant stream.

3. The process of claim 2, further comprising:
   feeding the warmed refrigerant stream from the gas dewpoint control plant to the first compression train suction knockout drum;
   recovering a liquid condensate product stream from the first separation train suction knockout drum;
   feeding the vapor stream from the first separation train knockout drum to the second separation train suction knockout drum; and
   feeding the vapor stream from the second separation train knockout drum to the third separation train suction knockout drum;
   combining a condensate stream from each of the first, second and third compression train knockout drums to form the condensate stream.

4. The process of claim 2, further comprising:
   feeding the warmed refrigerant stream from the gas dewpoint control plant to the second compression train suction knockout drum;
   recovering a liquid condensate product stream from the second separation train suction knockout drum;
   feeding the vapor stream from the first separation train knockout drum to the second separation train suction knockout drum; and
   feeding the vapor stream from the second separation train knockout drum to the third separation train suction knockout drum;
   combining a condensate stream from each of the first, second and third compression train knockout drums to form the condensate stream.

5. The process of claim 2, further comprising:
   feeding the warmed refrigerant stream from the gas dewpoint control plant to the third compression train suction knockout drum;
   recovering a liquid condensate product stream from the third separation train suction knockout drum,
   feeding the vapor stream from the first separation train knockout drum to the second separation train suction knockout drum; and feeding the vapor stream from the second separation train knockout drum to the third separation train suction knockout drum;

combining a condensate stream from each of the first, second and third compression train knockout drums to form the condensate stream.

6. The process of claim 5, comprising:

receiving the liquid condensate stream from each of the knockout drums in a condensate collection drum;

recovering the export condensate stream from the condensate collection drum; and recovering the refrigerant stream from the condensate collection drum.

7. The process of claim 6, comprising:

receiving the compressed gas stream in a dehumidifier;

dehumidifying the compressed gas stream to produce a dehumidified compressed gas stream;

feeding the dehumidified compressed gas stream to a gas chiller; and feeding the chilled compressed gas stream to a dewpoint knockout drum, in the dewpoint knockout drum, separating the chilled compressed gas stream into a chilled export gas stream and a dewpoint condensate stream.

8. The process of claim 6, further comprising:

feeding a first portion of the liquid condensate from the condensate collection drum to the first separation train suction knockout drum; and feeding a second portion of the liquid condensate from the condensate collection drum to the second separation train suction knockout drum.

9. The process of claim 2, wherein the third compression train further comprises a dehumidifier that receives the high-pressure gas stream from the crude processing plant and the vapor stream from the second compression train knockout drum and produces a dehumidified stream, and wherein the third compression train suction knockout drum receives the dehumidified stream and the warmed refrigerant stream.

10. The process of claim 9, further comprising feeding the chilled compressed gas stream to a dewpoint knockout drum, separating the chilled compressed gas stream into a chilled export gas stream and a dewpoint condensate stream, and wherein a flow system comprises a condensate collection drum and a condensate collection and distribution system, wherein:

the condensate collection and distribution system receives the liquid condensate stream from the third separation train knockout drum and the dewpoint condensate stream and produces the refrigerant stream and an excess condensate stream; and the condensate collection drum receives the condensate stream from each of the first, second, and third compression train suction knockout drums, from each of the first and second compression train knockout drums, and a first portion or a whole of the excess condensate stream.

11. The process of claim 10, further comprising:

feeding a second portion of the excess condensate stream to the first separation train suction knockout drum;

feeding a third portion of the excess condensate stream to the second separation train suction knockout drum.

12. The process of claim 11, further comprising indirectly heating the second portion using a first heat exchanger, and indirectly heating the third portion using a second heat exchanger.

* * * * *